(12) United States Patent
Abbas

(10) Patent No.: US 11,202,446 B1
(45) Date of Patent: Dec. 21, 2021

(54) SCENT DISPERSAL FORMULATION AND APPARATUS

(71) Applicant: A-WAY HUNTING PRODUCTS INC., Beaverton, MI (US)

(72) Inventor: Greg A Abbas, Beaverton, MI (US)

(73) Assignee: A-WAY HUNTING PRODUCTS INC., Beaverton, MI (US)

( * ) Notice: Subject to any disclaimer, the term of this patent is extended or adjusted under 35 U.S.C. 154(b) by 0 days.

(21) Appl. No.: 16/854,473

(22) Filed: Apr. 21, 2020

Related U.S. Application Data

(60) Provisional application No. 62/836,833, filed on Apr. 22, 2019, provisional application No. 62/879,949, filed on Jul. 29, 2019.

(51) Int. Cl.
*A01N 25/08* (2006.01)
*A01M 29/12* (2011.01)
*A01M 31/00* (2006.01)
*A01N 63/10* (2020.01)

(52) U.S. Cl.
CPC .............. *A01N 25/08* (2013.01); *A01M 29/12* (2013.01); *A01M 31/008* (2013.01); *A01N 63/10* (2020.01)

(58) Field of Classification Search
CPC ........ A01N 25/08; A01N 63/10; A01M 29/12
See application file for complete search history.

(56) References Cited

U.S. PATENT DOCUMENTS

| | | |
|---|---|---|
| 5,555,665 A | 9/1996 | Fore |
| 5,914,119 A | 6/1999 | Dawson |
| 5,916,552 A | 6/1999 | Perry |
| 6,685,929 B2 | 2/2004 | Burgeson et al. |
| 7,947,298 B2 | 5/2011 | Torre |
| 2005/0089543 A1 | 4/2005 | Weiser |
| 2006/0088500 A1 | 4/2006 | Cole |
| 2007/0092544 A1* | 4/2007 | Mills ............ A01N 65/00 424/405 |
| 2009/0246241 A1* | 10/2009 | Pitt ............ A01N 25/34 424/410 |
| 2009/0307957 A1* | 12/2009 | Gass ............ A01M 31/008 43/1 |
| 2011/0002878 A1 | 1/2011 | Lamoreaux |
| 2014/0037575 A1 | 2/2014 | Mitchell |
| 2015/0096218 A1 | 4/2015 | Burr |
| 2020/0054005 A1 | 2/2020 | Remmert et al. |

OTHER PUBLICATIONS

AlmaNaturals (https://www.almanaturals.net/soaps-farts-category) available Dec. 19, 2018, p. 1 (Year: 2018).*
Almanaturals date—google search for "deer sorbitan oleate" on Mar. 11, 2021, pp. 1-2 (Year: 2021).*

* cited by examiner

*Primary Examiner* — Andrew S Rosenthal
(74) *Attorney, Agent, or Firm* — Technology Law PLLC; Karen L Kimble

(57) ABSTRACT

A formulation that is a water soluble, solid formulation having a first component of one or more compounds selected from thickening agents and anti-drying agents including, but are not limited to, glycerins, propylene glycol, fatty acids, salts of fatty acids, sugars, and other components and a second component of an animal attractant or an animal or insect repellant. When an apparatus to dispense the formulation is used, it is either a post embedded into the formulation or a fastener mounted with respect to the solid mixture, where the fastener is configured to suspend the solid mixture.

18 Claims, 3 Drawing Sheets

SCENT DISPERSAL FORMULATION AND APPARATUS

FIELD OF THE INVENTION

Deer and other game animals have keen senses of smell. Human scents typically repel game animals, whereas various attractive scents may be used by hunters to lure game animals. Urine, either natural or synthetic, is sometimes employed by hunters to either attract deer and similar animals or to cover the scent of the hunter.

BACKGROUND OF THE INVENTION

Many formulations and apparatus to dispense them are known in the hunting industry. These formulations can be in the form of sprays, aerosols, solids, or liquids and dispensed in a variety of ways by the hunter. These formulations can be to attract game to the hunter or to repel various animals and insects away from gardens, crops or certain sites. Because weather plays a significant role in the use of these formulations, many different approaches have been tried with varying degrees of success. Some of the methods used are described below.

U.S. Pat. No. 7,947,298 describes a liquid mixture of animal repellent concentrate, mostly made of peppermint oil and/or rotten eggs, that are diluted and applied to plants to repel animals.

U.S. Pat. No. 5,916,552 concerns a semi-solid deer attractant of a liquid deer urine and gelatin without a flavor to form a semi-solid rubbery composition (like Jell-O™), which has to be poured and used in a container.

US Pub. Appln. 2005/0089543 teaches a combination of soil, sawdust, vegetable husks and other materials that are ground up, creating a product that has a consistency of sawdust, and is used as a scented bed to attract animals, or as a scented sawdust that is spread on the ground to deter animals around garden.

US Pub. Appln. 2020/0054005 uses a combination of sawdust and other materials to create a hard-pelletized product with a fragrance, similar or same as hard animal feed pellets (like rabbit pellets) that is put on the ground for its use. This product will biodegrade in nature, but it will break down into small sawdust looking piles as is dissolves.

US Pub. Appln. 2014/0037575 describes a soy wax drop having game animal liquid urine or fragrance oil added. Soy wax beads are used in candle making and are often scented with a perfume fragrance. Mitchell simply added deer urine instead of perfume to candle wax, which was already on the market. Their product uses a freezing process to get the deer urine fragrance onto the outside of soy wax beads.

US Pub. Appln. 2011/0002878 uses a wax and scent impregnated soil where the soil is coated with the wax. He teaches that his product encapsulates scented soil with wax to form a granular product similar to waxed beach sand that is spread on the ground for its use. Lamoreaux uses a single common wax, most likely candle wax or bees wax for his product, This listing is merely some of the various formulations that have been tried for this use with wild game animals.

SUMMARY OF THE INVENTION

This invention provides an apparatus and formulation for attracting or repelling game animals, especially deer such as whitetail deer. According to a first embodiment of the invention, a scent dispersal formulation is a water-soluble, solid formulation that includes an animal attractant, such as natural and/or synthetic urine or other known attractant, and a carrier that maintains the solid formulation until natural weather conditions dissolve it or the animal eats it. The apparatus is a way for providing the formulation; the apparatus with the formulation form a lure. The scent dispersal formulation improves upon the prior art because, unlike liquid attractants, the scent dispersal apparatus does not immediately wash away after contact with moisture (e.g., rain, dew, other moisture); instead, any moisture causes the formulation to slowly dissolve, exposing new layers of scent as the old layers are dissolved and carried away. Accordingly, by releasing the scent of the animal attractant with repeated exposures to moisture, the scent dispersal formulation is significantly longer-lasting than prior art hunting lures and animal attractants.

Furthermore, as layers of the solid formulation are dissolved and carried away by water, the attractant is carried by the water to the ground surrounding the lure, thereby impregnating the ground around the lure with the animal attractant scent. In one embodiment, the apparatus includes a post that supports the solid formulation above the ground, exposing the solid mixture to wind. Accordingly, the scent dispersal apparatus also disperses the animal attractant into the air. The apparatus can also include a wick or string embedded or attached to the formulation to form the lure and can be attached to a bush or tree limb.

According to a second aspect of the invention, a scent dispersal formulation is a water-soluble, solid formulation that includes an animal and insect repellent, such as, but not limited to, blood meal, garlic, rotten eggs and citronella. The lure releases the animal repellent formulation with repeated exposures to moisture, thereby providing long-lasting scent dispersal. For example, the lure having the repellent may be used in gardens to repel insects, deer, and/or rabbits, or any other location where animals are not wanted.

This invention describes a formulation comprising a base component and an animal attractant or repellant component, wherein the formulation can be combined with an apparatus to make a lure, process for preparing the formulation and methods of using the formulation and lure.

In a further embodiment of this invention, the formulation can be shaped into a candy cane or donut and the formulation can be hung on a branch of a tree or bush. Additionally, the formulation can be put on the ground and could be any shape, such as those above or as a disk. No other apparatus is needed.

The above features and advantages and other features and advantages of the present disclosure are readily apparent from the following detailed description of the best modes for carrying out the disclosure when taken in connection with the accompanying drawings.

DETAILED DESCRIPTION

Figure 1:
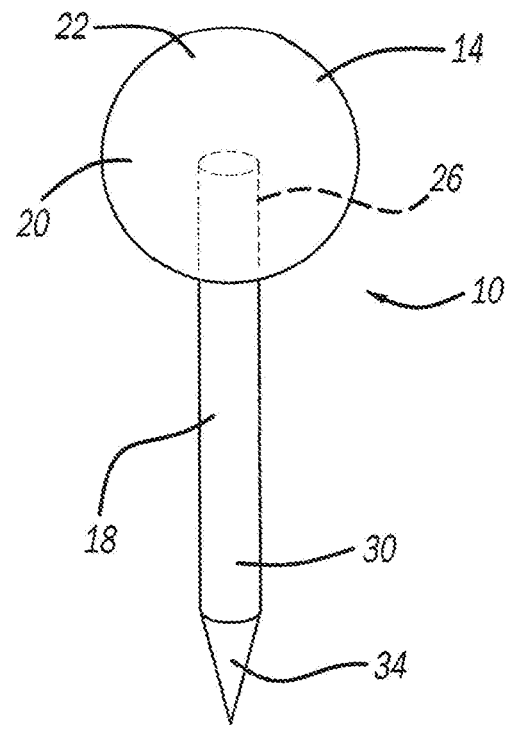
FIG. 1 is a schematic, front view of a scent dispersal apparatus having a solid mixture including an animal attractant, and a post operatively connected to the solid mixture.

A formulation of this invention is a water-soluble solid that has as a first component one or more compounds selected from:
thickening agents and anti-drying agents including, but are not limited to, glycerins, propylene glycol, fatty acids, salts of fatty acids, sugars, and other components to create a water-soluble solid at standard temperature and pressure, and
provided that the solid has a lesser thickness than wax, will resist drying out when exposed to the weather conditions, and is biodegradable.

The formulation ingredients include:
as a first component that is the base composition:
(a) 1-10% by weight of one or more $C_4$-$C_{28}$ fatty acids including their salts, preferably $C_{12}$-$C_{24}$ fatty acids, including but not limited to stearic acid, sodium stearate, myristic acid, sodium myristate, lauric acid, sodium laurate, sodium lauryl sulfate (sodium laureth sulfate), pentasodium pentetate (pentasodium diethylenetriaminepentaacetate), sorbitan oleate;
(b) 30-55% by wt. of one or more plant oils including but not limited to coconut oil; palm oil; safflower oil; glycerin (kosher, of vegetable origin containing 20% coconut oil);
(c) 1-6% by weight of solid sodium hydroxide;
(d) 3-10% by weight of sugars such as sorbitol, sucrose, and plant-based sweeteners;
(e) 15-30% by weight of propylene glycol (made from vegetable glycerin);
(f) 4-10% by weight of oat protein;
(g) 10-25% by weight of distilled water; and
(h) optionally, one or more additional ingredients can be added such as tetrasodium etidronate ((1-hydroxyethylidene)bis-phosphonic acid tetrasodium salt); sodium chloride; or silica; and
where the total of all base ingredients is 100% by weight; and
has as a second component as the attractant or repellant:
(i) an attractant such as urine (natural and/or synthetic) or one or more repellants including but not limited to moth balls, lime sulfur, Thiram, shredded deodorant soap, creosote, nicotine, ammonia, blood meal, garlic, rotten eggs or citronella.
wherein the ratio of component one (base) to component two (attractant or repellant) is from 4:2, preferably 3:1, and wherein the total is 100% by weight of the formulation.

In one particular embodiment, the formulation includes (in % by weight) having all values stated within ±1-5%: water (10-20%), propylene glycol (20-25%), glycerin (10-18%), sorbitol (1-10%), oat protein (5-10%), sorbitan oleate (4-10%), sodium hydroxide (2-5%), palm oil (12-20%) and coconut oil (12-20%), where the total of all components is 100%. Other formulations are intended using the components listed above.

The selection of ingredients in the formulation is done based on the apparatus used to dispense the formulation. However, if there is no apparatus used to dispense the formulation, namely, the formulation is tossed on the ground, then the climate where the formulation will be used and the season of the year for the outdoor temperatures must be such that the solid formulation will not dissolve too quickly.

The reason for the apparatus to be used with the formulation, which together form a lure, is to provide a method to use the formulation that is better suited to any weather conditions, gives superior downwind scent, forms scented droplets with moisture, that also feeds scent to the ground, that when used for deer hunting, creates a deer scrape that is continually being supplied with scent droplets dripping from the apparatus. This later feature is desirable, as it avoids human contamination from frequenting the hunting area that takes place with most other scent methods. When used to repel animals and/or insects, it too is convenient to the user, as they do not have to constantly spray liquids around the house or garden every time rain washes away their liquid repellants. Furthermore, this apparatus is environmentally safe and biodegradable.

A second component present in the formulation is an animal repellent (e.g., citronella and others) or an animal attractant (e.g., deer urine, synthetic urine or other synthetic attractants).

The formulation is prepared by heating the first component ingredients without the sodium hydroxide, to about 130-150° F. until melted. The sodium hydroxide is then added to the melted first component along with the second component and mixed until homogenous. After mixing the water-soluble formulation can be shaped to use or made into a lure by pouring the melted formulation into a mold or cavity and letting is cool to solidify forming the water-soluble, solid formulation.

Figure 2:
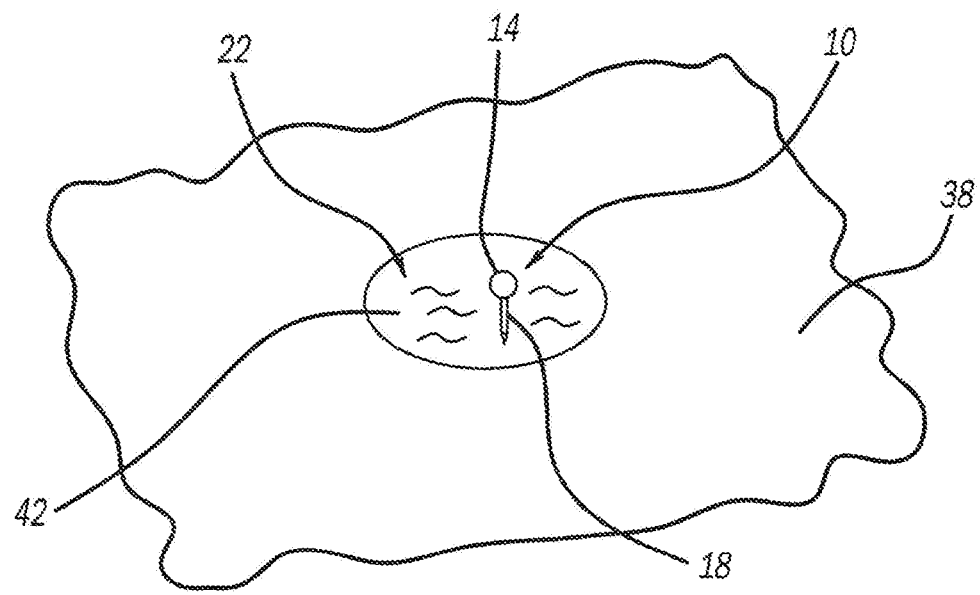
FIG. 2 is a schematic, perspective view of the scent dispersal apparatus in one example of use.

Referring to FIGS. 1 and 2, wherein like reference numbers refer to like components, a scent dispersal apparatus 10 is schematically depicted. The scent dispersal apparatus 10 includes a water-soluble solid member 14 and a post 18. The solid member 14 is a formulation as defined above of one or more compounds 20 that form a solid at standard temperature and pressure and an animal attractant 22, i.e., a formulation having a scent that lures or attracts one or more types of animals. In one embodiment, the animal attractant 22 is urine, which may be either natural or synthetic. In another embodiment, the animal attractant 22 is one or more compounds found in urine. The urine may, for example, be deer urine.

A portion 26 of the post 18 extends into the solid member 14, and another portion 30 of the post 18 protrudes from the solid member 14. The post 18 is generally cylindrical along its length. In the embodiment depicted, the post 18 includes a tapered end 34, which facilitates insertion of the post 18 into the ground 38.

Referring specifically to FIG. 2, a method of use of the scent dispersal apparatus 10 is schematically depicted. The method may include inserting the post 18 into the ground 38. Though the apparatus 10 may be placed anywhere outside and be within the scope of the claimed invention, one particularly effective location for placement in the ground 38 is in a scrape 42, as shown in FIG. 2. The method may further include permitting the apparatus 10 to be exposed to moisture, such as rain or dew, so that the solid member 14 dissolves in the moisture, which then carries the attractant 22 to the ground 38 and/or scrape 42.

Figure 3:
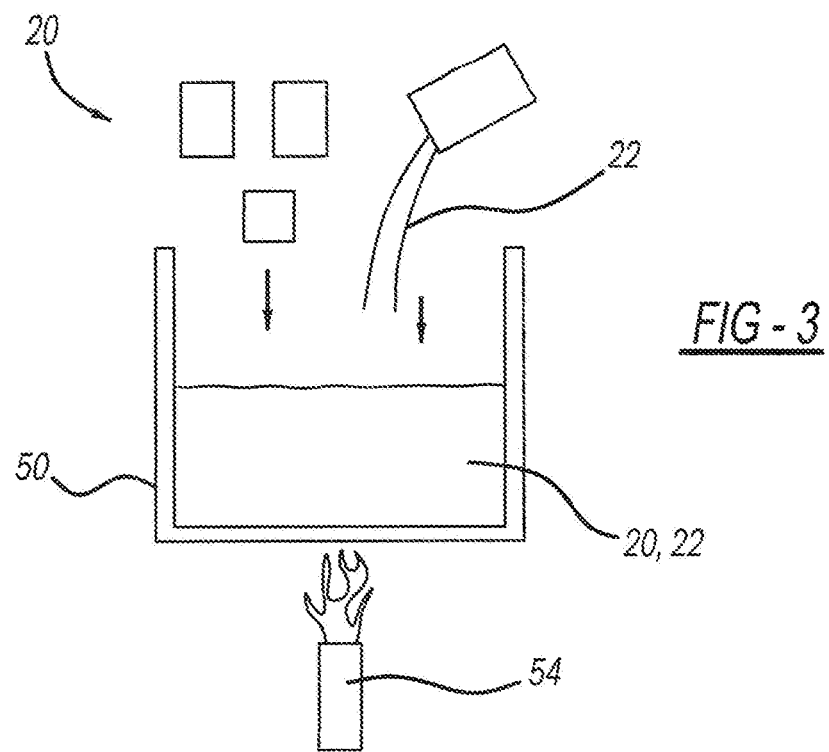
FIG. 3 is a schematic, partial cutaway, side view of a method of making the solid mixture.

Referring to FIG. 3, wherein like reference numbers refer to like components from FIGS. 1-2, a method of making a scent dispersal apparatus is schematically depicted. Compound or compounds 20 are placed in a container 50, which is subjected to a heat source 54 and heated until the compound or compounds 20 are melted and liquid. Attractant 22 is added to the melted compound or compounds 20 and mixed until homogenous to form the formulation.

Figure 4:
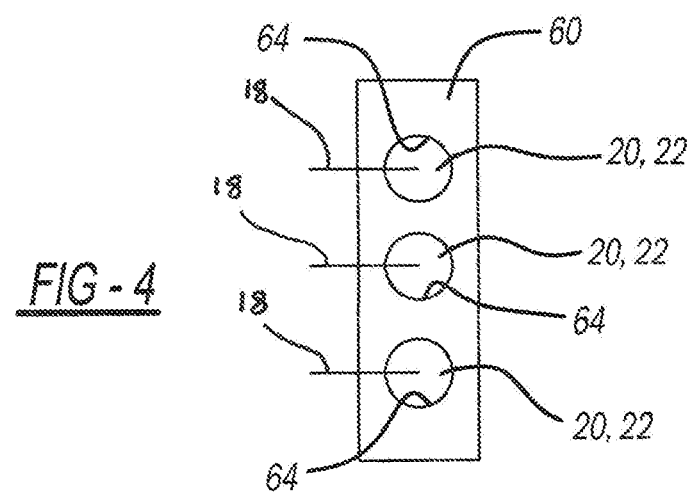
FIG. 4 is a schematic, top view of a mold for forming the solid mixture.

Referring to FIG. 4, wherein like reference numbers refer to like components from FIGS. 1-3, the melted, homogenous formulation of compound(s) 20 and attractant 22 is then poured into the cavities 64 of a mold 60. The posts 18 are also placed partially in the cavities 64 and the melted mixture. The formulation of compound(s) 20 and attractant 22 is then cooled or permitted to cool, which causes the formulation of compound(s) 20 and attractant 22 to solidify and form solid members 14.

In the embodiment depicted, the cavities 64 are cylindrical, with a diameter that is substantially larger than the height, which results in a "lollipop" shape. However, any shape of the cavities 64 and solid member 14 may be employed within the scope of the claimed invention.

Figure 5:
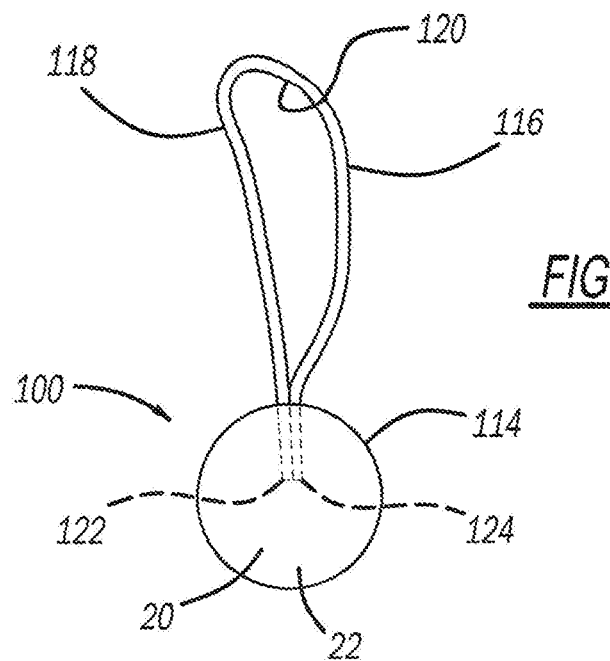
FIG. 5 is a schematic, side view of another scent dispersal apparatus configuration.

Referring to FIG. 5, wherein like reference numbers refer to like components from FIGS. 1-4, another scent dispersal apparatus 100 in accordance with an alternative embodiment is schematically depicted. The scent dispersal apparatus 100 includes a water-soluble solid member 114 that is substantially similar to the solid member shown at 14 in FIGS. 1 and 2. The apparatus 100 also includes a fastener 116 mounted with respect to the member 114 for suspending the member 114.

In the embodiment depicted, the fastener 116 is a string 118 forming a loop 120. More specifically, the string 118 has both ends 122, 124 molded into the solid member 114. The solid member 114 is comprised of the compounds 20 and animal attractant 22. As used herein, a "string" includes any relatively thin, flexible material, such as, but not limited to, string, thread, cord, wire, etc. Alternatively, the fastener 116 may be a hook (not shown).

Figure 6:
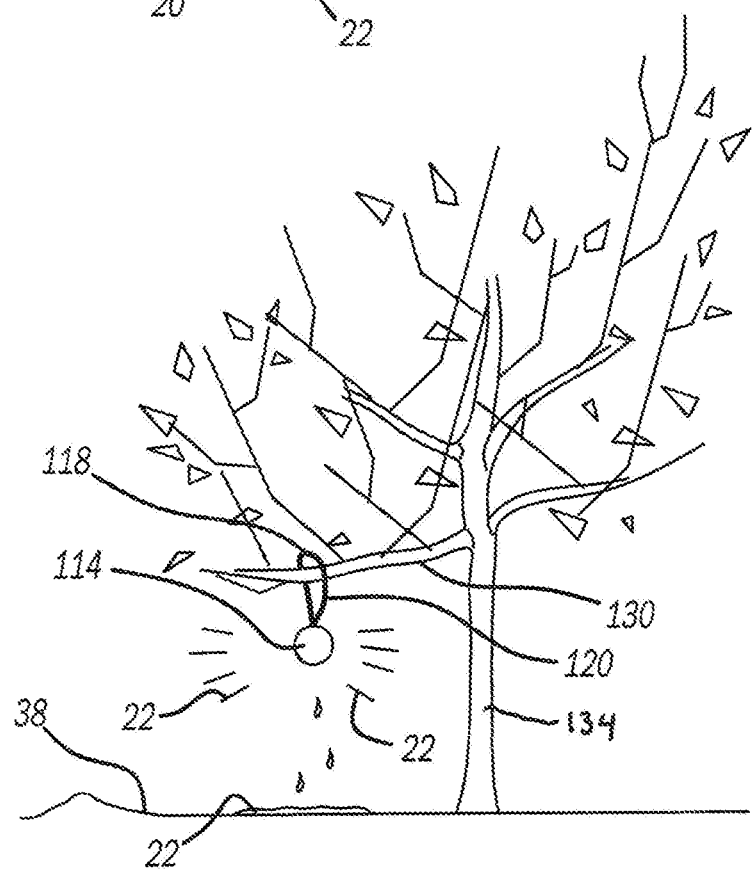
FIG. 6 is a schematic, side view of the scent dispersal apparatus of FIG. 5 in one example of use.

Referring to FIG. 6, wherein like reference numbers refer to like components from FIGS. 1-5, the scent dispersal apparatus 100 is suspended from a branch 130 of a tree 134. More specifically, the branch 130 extends through the loop 120 of the string 118 such that the solid member 114 is suspended above the ground 38. Similar to the use shown in FIG. 2, when the solid member 114 is exposed to moisture, the attractant 22 is dissolved and drips to the ground 38 and/or is vaporized into the air and carried by the wind.

It should be noted that in an alternative embodiment of the scent dispersal apparatuses 10 and 100, element 22 may be an animal or insect repellent instead of an animal attractant. Accordingly, apparatuses 10 or 100 may be used to repel animals, including insects, from places such as, but not limited to, gardens. The repellent may be any compound having a scent that repels one or more animals. In one embodiment, the repellent 22 is citronella. Other repellants may be used such as blood meal, garlic, or rotten eggs, or other suitable repellants.

While the best modes for carrying out the disclosure have been described in detail, those familiar with the art to which this disclosure relates will recognize various alternative designs and embodiments for practicing the disclosure within the scope of the appended claims.

The invention claimed is:

1. A water-soluble, solid formulation that includes one or more $C_4$-$C_{28}$ fatty acids, one or more plant oils, sodium hydroxide, a sugar, propylene glycol, oat protein, water and a deer attractant.

2. The formulation of claim 1 further including one or more of tetrasodium etidronate ((1-hydroxyethylidene)bisphosphonic acid tetrasodium salt); sodium chloride; or silica.

3. The formulation of claim 1, wherein the formulation has a first component that is the base of the formulation having the following ingredients:

(a) 1-10% by weight of one or more $C_4$-$C_{28}$ fatty acids including their salts, including but not limited to stearic acid, sodium stearate, myristic acid, sodium myristate, lauric acid, sodium laurate, sodium lauryl sulfate (sodium laureth sulfate), pentasodium pentetate (pentasodium diethylenetriaminepentaacetate), and sorbitan oleate;

(b) 30-55% by wt. of one or more plant oils including but not limited to coconut oil; palm oil; safflower oil; glycerin (kosher, of vegetable origin containing 20% coconut oil);

(c) 1-6% by weight of solid sodium hydroxide;

(d) 3-10% by weight of sugars such as sorbitol, sucrose, and plant-based sweeteners;

(e) 15-30% by weight of propylene glycol;

(f) 4-10% by weight of oat protein; and (g) 10-25% by weight of distilled water; and where the total of all base ingredients is 100% by weight; and wherein a second component is the attractant; and wherein the ratio of component one (base) to component two (attractant) is from 4:2 and wherein the total of both components is 100% by weight of the formulation.

4. The formulation of claim 3 wherein the attractant is urine (natural and/or synthetic).

5. The formulation of claim 3 wherein the ratio of component one (base) to component two (attractant) is from 3:1.

6. The formulation of claim 3, wherein the first component has the ingredients:

(a) 4-10% of sorbitan oleate;

(b) 12-20% of coconut oil; 12-20% of palm oil; and 10-18% of glycerin;

(c) 2-5% of sodium hydroxide;

(d) 1-10% of sorbitol;

(e) 20-25% propylene glycol;

(f) 5-10% of oat protein;

(g) 10-20% of water;

where the total of all components is 100% and all values stated are within ±1-5%.

7. The formulation of claim 3, wherein the second component is synthetic deer urine.

8. The formulation of claim 1 wherein the fatty acids are $C_{12}$-$C_{24}$ fatty acids.

9. A process for preparing the formulation of claim 3 wherein: (a) all of the first components are mixed together, excluding sodium hydroxide, and heated to between about 130-150° F. until melted, (b) sodium hydroxide is then added to the melted first component along with the second component and mixed until homogenous, and (c) the water-soluble formulation can be shaped to use or made into a lure by pouring the melted formulation into a mold or cavity and letting is cool to solidify to form the water-soluble, solid formulation.

10. An apparatus comprising:

a water-soluble, solid formulation that includes one or more $C_4$-$C_{28}$ fatty acids, one or more plant oils, sodium hydroxide, a sugar, propylene glycol, oat protein, water and a deer attractant; and a member extending into the water-soluble, solid formulation.

11. The apparatus of claim 10, wherein the member is a post.

12. The apparatus of claim 11, wherein the post includes a tapered end.

13. The apparatus of claim 10, wherein the member is a fastener configured to suspend the water-soluble, solid formulation.

14. The apparatus of claim 13, wherein the fastener is a string defining a loop or a hook.

15. A method comprising:
placing a water-soluble, solid formulation outdoors such that the water-soluble, solid formulation dissolves over time when exposed to atmospheric moisture and/or wind;
wherein the water-soluble, solid formulation includes one or more C4-C28 fatty acids, one or more plant oils, sodium hydroxide, a sugar, propylene glycol, oat protein, water and a deer attractant.

16. The method of claim 15, wherein said placing the water-soluble, solid formulation outdoors includes supporting or suspending the water-soluble, solid formulation above the ground.

17. The method of claim 16, wherein the ground is a deer scrape whether natural or manmade.

18. The method of claim 15, wherein the formulation has a first component that is the base of the formulation having the following ingredients:
(a) 1-10% by weight of one or more $C_4$-$C_{28}$ fatty acids including their salts, including but not limited to stearic acid, sodium stearate, myristic acid, sodium myristate, lauric acid, sodium laurate, sodium lauryl sulfate (sodium laureth sulfate), pentasodium pentetate (pentasodium diethylenetriaminepentaacetate), and sorbitan oleate;
(b) 30-55% by wt. of one or more plant oils including but not limited to coconut oil; palm oil; safflower oil; glycerin (kosher, of vegetable origin containing 20% coconut oil);
(c) 1-6% by weight of solid sodium hydroxide;
(d) 3-10% by weight of sugars such as sorbitol, sucrose, and plant-based sweeteners;
(e) 15-30% by weight of propylene glycol;
(f) 4-10% by weight of oat protein; and
(g) 10-25% by weight of distilled water; and
where the total of all base ingredients is 100% by weight; and
wherein a second component is a deer attractant; and
wherein the ratio of component one (base) to component two (attractant) is from 4:2 and
wherein the total of both components is 100% by weight of the formulation.

\* \* \* \* \*